2,802,864

HIGHER ALKYL AMINE SALTS OF GLUTAMIC ACID

Bruno Vassel, Deerfield, Ill., assignor to International Minerals & Chemical Corporation, a corporation of New York No Drawing. Application September 1, 1953, Serial No. 377,967

8 Claims. (Cl. 260—501)

The instant invention relates to new derivatives of glutamic acid. More particularly, it relates to the synthesis of amine salts of glutamic acid.

Glutamic acid is produced in large quantities from proteinaceous material, such as wheat and corn gluten, and from liquors from beet root molasses residues from which sugar has been partially or wholly removed. At present, most of the glutamic acid produced is converted to monosodium glutamate which is a popular food condiment. However, glutamic acid could be made available in large quantities for the preparation of other useful derivatives.

It is an object of the instant invention to provide a new and useful class of derivatives of glutamic acid.

It is a further object of the instant invention to provide new derivatives of glutamic acid characterized as amine salts of glutamic acid.

It is a further object of the instant invention to provide processes for the preparation of amine salts of glutamic acid.

These and other objects of the instant invention will become more apparent as herein described.

It has been discovered that glutamic acid reacts under conditions as herein described with a primary or a secondary amine to form an amine glutamate.

In practicing the instant invention, a primary or a secondary amine, dissolved in a suitable solvent, is heated and glutamic acid, either optically active, for example the natural isomer or a racemic mixture, is added to the hot solution. Generally, the reaction is completed within between about 15 minutes and about 30 minutes. The reaction products are cooled, and the amine glutamate is crystallized and separated from the cooled solution.

The amine is admixed with a solvent which will dissolve the amine glutamate present in the resulting hot mixture containing the reaction product, but in which the amine glutamate is insoluble when the reaction product is cooled, for example to about atmospheric temperature. In preparing the amine glutamate of an amine having 7 or less carbon atoms per molecule, the amine is dissolved in butanol. For example, about 500 milliliters of butanol is generally employed as the solvent for each mole of amine. In preparing the glutamic acid derivative of amines having between 8 and 12 carbon atoms per molecule, about 500 milliliters of butanol containing between about 50 milliliters and about 75 milliliters of water is used for each mole of the amine. When preparing the amine glutamate of an amine having between 13 and 18 carbon atoms per molecule, or cyclohexylamine, a mixture of about 700 milliliters of butanol, about 200 milliliters of ethanol and about 100 milliliters of water is used as the solvent for each mole of the amine. Although these solvents are preferred in carrying out the instant invention, others in which the reactants and the product are inert and in which the amine salt is soluble at elevated temperatures and insoluble at about atmospheric temperature can also be employed.

In carrying out the invention the amine is dissolved in the solvent and is heated to between about 60° C. and about reflux temperature. Between about 0.9 and about 1 mole of glutamic acid is added to the hot solution and the resulting hot mixture is agitated or stirred until the reaction has proceeded to substantial completion. Generally, about 15 minutes is required for completion of the reaction. During this period of time, all but traces of the glutamic acid dissolves. Any glutamic acid which remains is separated, for example by filtration, and the resulting solution containing the reaction product is cooled. The amine glutamate is crystallized and separated from the cooled solution.

Occasionally the solution from which the product is to be crystallized becomes supersaturated, and seeding of the cooled solution is necessary in order to produce a crystalline product. In this case, a small amount of the solution, for example about one-half cubic centimeter is concentrated slowly, for example on a watch glass in a high vacuum, over a drying agent, such as phosphorus pentoxide. Seed crystals are obtained by this procedure and are added to the supersaturated solution containing the amine glutamate.

Single amines or mixtures of amines of either primary or secondary character may be employed. Examples of these are: hexylamine, butylamine, dibutylamine, diisobutylamine, isopropylamine, n-propylamine, di-n-propylamine, ethylamine, methylamine, diethylamine, dimethylamine, the long chain alkyl amines, octylamine, isooctylamine, decylamine, hexadecylamine, octadecylamine, dioctadecylamine, branched chain, long chain alkyl amines, and the like.

The long chain alkyl amine glutamates prepared in accordance with the instant invention are useful as flotation reagents, for example as collectors of potassium chloride in the separation of potassium chloride from other substances, such as sodium chloride present in ores, such as sylvinite. The amine glutamates also have antioxidant properties and inhibit formation of rust.

The following examples are given as illustrations of the practice of the instant invention, but it is understood that the invention is not limited thereto:

Example I

About 129.2 grams (one mole) of n-octylamine was dissolved in about 500 milliliters of n-butanol containing about 50 milliliters of water. This solution was heated to about 70° C. and then 139.8 grams (0.95 mole) of powdered L-glutamic acid was added to the hot solution gradually and with continuous stirring. After about 15 minutes, all but traces of the glutamic acid had dissolved. The resulting solution was filtered while hot, then cooled to room temperature, and seeded to prevent supersaturation. The seeded mixture was refrigerated for about 12 hours. N-octylamine glutamate crystals were separated by filtration and washed with ether. The product was dried in a vacuum in the presence of sulfuric acid.

Example II

About 99.2 grams (one mole) of cyclohexylamine was dissolved in about 700 milliliters of butanol containing about 200 milliliters of ethanol and about 100 milliliters of water. The solution was heated to about 70° C., then about 139.8 grams (0.95 mole) of powdered L-glutamic acid was added to the hot solution gradually and with continuous stirring. After the reaction was completed, the reaction products were cooled, and cyclohexylamine glutamate crystallized and was separated from the solution in the manner described in Example I.

Example III

About 157.3 grams (one mole) of n-decylamine was dissolved in about 500 milliliters of n-butanol containing about 75 milliliters of water. This solution was heated to about 70° C., then 139.8 grams (0.95 mole) of powdered L-glutamic acid was added to the hot solution gradually, and the hot solution was stirred for about 15 minutes. The resulting solution was filtered while hot, then cooled to room temperature, and seeded to prevent supersaturation. The seeded mixture was refrigerated for about 12 hours. N-decylamine glutamate crystals were separated by filtration and washed with ether. This product was dried in a vacuum over sulfuric acid.

Example IV

About 185.3 grams (one mole) of n-dodecylamine was dissolved in about 500 milliliters of n-butanol containing about 50 milliliters of water. This solution was heated to about 70° C., and about 139.8 grams (0.95 mole) of powdered L-glutamic acid was added to the hot solution gradually and with continuous stirring. After about 15 minutes the resulting solution was filtered while hot, then cooled to room temperature, and seeded to prevent supersaturation. The seeded mixture was refrigerated for about 12 hours. N-dodecylamine glutamate crystals were separated by filtration and washed with ether. The product was dried in a vacuum over sulfuric acid.

The following table lists the melting points and the solubilities in water and in n-butanol of the amine glutamates prepared in the above examples:

| Example | Amine Glutamate | Solubility at about 25° C. | | Melting Point, °C. |
|---|---|---|---|---|
| | | Water, g./100 ml. soln. | n-butanol, g./100 ml. soln. | |
| I | n-octylamine glutamate | 30.79 | 0.106 | 150.5 |
| II | cyclohexylamine glutamate | 6.58 | 0.080 | 157.7 |
| III | n-decylamine glutamate | 23.08 | 0.071 | 160.9 |
| IV | n-dodecylamine glutamate | 36.27 | 0.064 | 165.0 |

Having thus fully described the character of the instant invention, what is desired to be claimed and protected by Letters Patent is:

1. An amine salt of glutamic acid having the following structural formula:

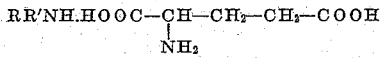

$$RR'NH.HOOC-CH-CH_2-CH_2-COOH$$
$$|$$
$$NH_2$$

where R is an alkyl radical containing from 8 to 18 carbon atoms and R' is selected from the group consisting of R and hydrogen.

2. An amine salt of glutamic acid having the following structural formula:

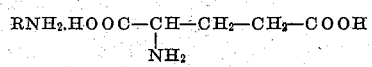

$$RNH_2.HOOC-CH-CH_2-CH_2-COOH$$
$$|$$
$$NH_2$$

where R is an alkyl radical containing from 8 to 18 carbon atoms.

3. As a new product n-octylamine glutamate.
4. As a new product n-decylamine glutamate.
5. As a new product n-dodecylamine glutamate.
6. A process for the preparation of an amine glutamate which comprises reacting glutamic acid with a nitrogen compound selected from the group consisting of monoalkylamines and dialkylamines wherein each alkyl group contains from 8 to 18 carbon atoms at a temperature between about 60° C. and about reflux temperature in a solvent medium comprising essentially aqueous butanol, wherein the reaction product is soluble at about the temperature of the reaction and insoluble at about atmospheric temperature, cooling the mixture containing the reaction product, crystallizing and separating the amine glutamate from the cooled mixture.

7. A process for the preparation of an amine glutamate which comprises dissolving a primary amine having between about 8 and about 12 carbon atoms per molecule in a solvent medium comprising about 500 milliliters of butanol and between about 50 milliliters and about 75 milliliters of water per mole of amine, heating the solution containing the amine to a temperature between about 60° C. and about reflux temperature, adding glutamic acid to the resulting hot solution, agitating the resulting hot mixture until the reaction has proceeded to substantial completion, cooling the reaction products, crystallizing and separating the amine glutamate product from the cooled mixture.

8. A process for the preparation of an amine glutamate which comprises dissolving a primary amine having between about 13 and about 18 carbon atoms per molecule in a solvent medium comprising about 700 milliliters of butanol, about 200 milliliters of methanol, and about 100 milliliters of water per mole of amine, heating the solution containing the amine to between about 60° C. and about reflux temperature, adding glutamic acid to the resulting hot solution, agitating the resulting hot mixture until the reaction has proceeded to substantial completion, cooling the reaction products, crystallizing and separating the amine glutamate product from the cooled mixture.

References Cited in the file of this patent

UNITED STATES PATENTS

| 2,274,807 | Rawlins et al. | Mar. 3, 1942 |
| 2,401,993 | Wasson et al. | June 11, 1946 |
| 2,556,907 | Emmick | June 12, 1951 |
| 2,586,295 | Brown et al. | Feb. 19, 1952 |

FOREIGN PATENTS

| 4,217 of 1950 | Japan | Nov. 30, 1950 |

(Abstracted in Chem. Abst. 47 (1953) 3343(g))

OTHER REFERENCES

Brigando et al.: Chem. Abst. 43 (1949), 7426(b).